Nov. 5, 1940.  W. R. GRISWOLD  2,220,325
TRANSMISSION MECHANISM
Filed July 10, 1939
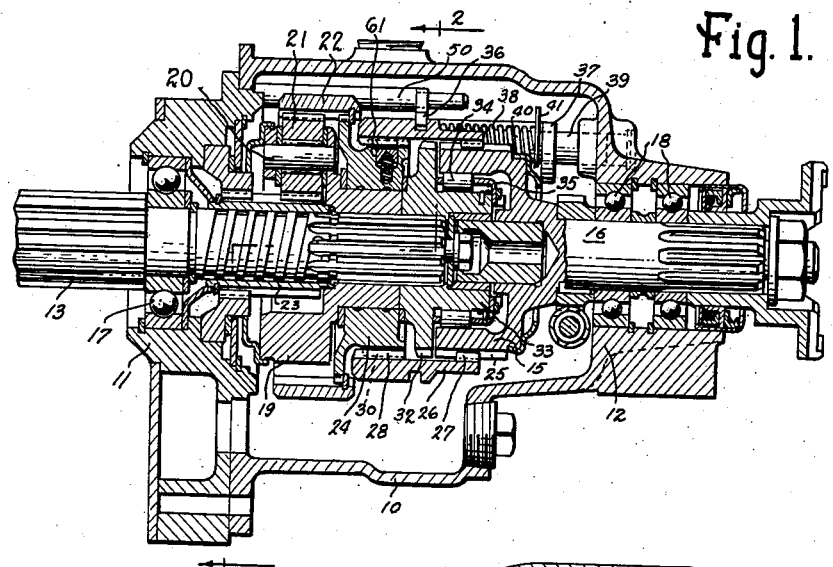
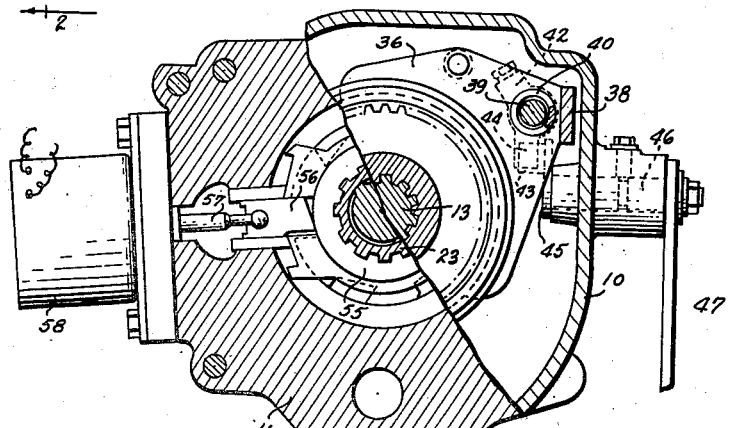
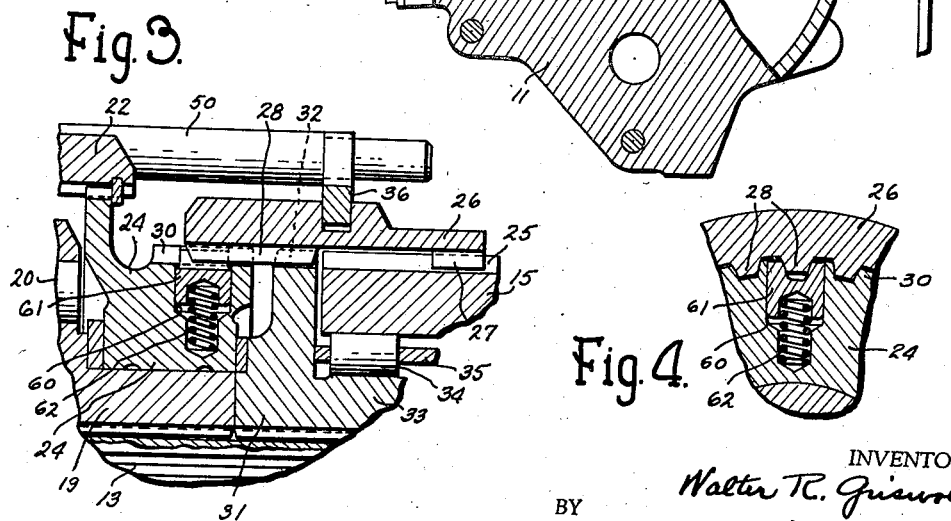
INVENTOR.
Walter R. Griswold
BY
Sibbett & Hart
ATTORNEYS Patented Nov. 5, 1940

2,220,325

UNITED STATES PATENT OFFICE 2,220,325

TRANSMISSION MECHANISM

Walter R. Griswold, Detroit, Mich., assignor to Packard Motor Car Company, Detroit, Mich., a corporation of Michigan Application July 10, 1939, Serial No. 283,604

6 Claims. (Cl. 74—290)

This invention relates to a power transmission mechanism of the type in which the drive from selective change speed gearing can be modified.

Many motor vehicles are now equipped with drive modifying mechanism arranged between the selective change speed gearing rotated drive shaft and the driven shaft. Planetary gearing is usually employed to connect such shafts and provision is made for holding or releasing the planetary gearing sun gear to establish modified or direct drive, and further provision is made for selectively positively clutching together either the planetary gearing or the drive shaft with the driven shaft. When the planetary gearing is unclutched and the drive and driven shafts are clutched together, the planetary gearing is free to idle. As the driven shaft usually operates at a different speed than the drive shaft or the planetary gearing at the time the clutch is shifted, the teeth of the clutch elements cannot engage quietly until the speeds are synchronized and, consequently, abutment of the teeth of the clutch elements occurs and results in objectionable noise and undesirable wear and breakage. Further, the planetary gearing when idling freely acts as a flywheel and sets up undesirable vibrational conditions in the mechanism.

An object of the invention is to reduce noise and vibration in drive modifying mechanism of the type referred to.

Another object of the invention is to improve the operating conditions of speed modifying mechanism of the planetary type by means that prevents the planetary gearing from idling freely at any time.

Another object of the invention is to prevent clutch clash in drive modifying mechanism by the provision of a constantly engaged relationship of the clutch with the planetary gearing and driven shaft.

Still another object of the invention resides in the provision of vibration damping means between drive modifying planetary gearing and a control clutch that is in constant engagement with the gearing.

Other objects of the invention will appear from the following description taken in connection with the drawing, which forms a part of this specification, and in which:

Fig. 1 is a sectional view of drive modifying mechanism having the invention associated therewith;

Fig. 2 is a sectional view of the same taken approximately on line 2—2 of Fig. 1;

Fig. 3 is an enlarged fragmentary view of the mechanism shown in Fig. 1 showing the clutch shifted into its rearmost position;

Fig. 4 is a fragmentary sectional view of the clutch vibration damping mechanism.

Referring to the drawing by characters of reference, 10 represents a portion of the transmission mechanism casing for a motor vehicle having a front wall 11 and a rear wall 12. Projecting through the front wall of the casing is a drive shaft 13, that may be the tail shaft, of conventional motor vehicle change speed gearing, adapted to be driven at a plurality of selected forward speeds or in reverse. This drive shaft extends substantially to the rear wall of the casing and the rear end thereof lies adjacent the forward enlarged end 15 of the driven shaft 16. The driven shaft projects through the rear wall of the casing and is adapted to be connected in a conventional manner with vehicle driving road wheels. The ball bearing 17 in wall 11 supports the drive shaft and ball bearings 18 in wall 12 support the driven shaft.

These shafts 13 and 16 are connected in driving relation by mechanism that can be controlled to selectively provide a positive direct drive, a direct drive through an overrunning clutch, or a modified drive which in this instance is overdrive. The planetary gearing consists of a cage 19, having a rearwardly extending sleeve portion splined to shaft 13, carrying journals 20 on which planet gears 21 are rotatably mounted. The planet gears mesh with internal teeth of a planetary ring gear 22 and they also mesh with the external teeth of a sun gear 23 rotatably mounted on the shaft 13. Rotatably mounted on the sleeve portion of cage 19 and fixed to rotate with the ring gear 22 by means of splines is a clutch element 24. The ring gear 22 and the clutch element 24 can be formed as one piece if desired.

The forward end 15 of the tail shaft 16 is enlarged and has clutch teeth 25 formed thereon. An axially shiftable clutch sleeve 26 telescopes the forward portion of the driven shaft and has internal teeth 27 that are in constant meshing driving relation with the teeth 25. At the forward end of this shiftable clutch sleeve are provided internal teeth 28 that are in constant meshing relation with teeth 30 formed on the rear end of the clutch element 24. A driving member 31 is splined to the rear end portion of the drive shaft 13. This driving member has teeth 32 similar to and arranged to align with the clutch teeth 25 and 30 so that they can be engaged by the teeth 28 of the clutch sleeve 26 when shifted to rearmost position. This driving member is formed with a rearwardly extending hub 33 provided with peripheral cam surfaces and between such cam surfaces and the interior wall of the flanged end of the tail shaft is arranged a plurality of rollers 34 carried by a cage 35 and adapted to provide an overrunning clutch connection between the member 31 and the driven shaft 16.

The clutch sleeve 26 is shiftable manually to provide a direct driving connection from either the clutch element 24 or the driving member 31 to the driven shaft 16. In order to control the position of this clutch sleeve it is engaged by a yoke 36 forming one end of a U-shaped device that includes a ring 37 and a connecting bar 38. The ring is slidably mounted upon a shaft 39 that is mounted for limited axial movement in casing 10. A coil spring 40 surrounds the shaft 39 and is anchored at its rear end to such shaft by a spring clip 41, while its front end bears against the yoke 36. Fixed on the shaft 39 in advance of the yoke is an actuator member 42 having a pair of spaced fingers 43 depending therefrom between which a cam element 44 extends. This cam element is carried by an arm 45 fixed upon the end of a shaft 46 projecting through and carried by the side wall of casing 10. Fixed to the outer end of this shaft 46 is a lever 47 that can be manually rocked by suitable mechanism (not shown) extending to the dash for operation by the vehicle driver.

The clutch sleeve 26 can also be manually shifted to provide direct positive drive from the member 31 to the driven shaft by a rearward movement of rod 50. This rod extends through yoke 36 and has a shoulder engaging the yoke to move it therewith when shifted rearwardly. The reverse shift rail of the change speed gearing can be utilized to push the rod rearwardly when moved to establish reverse drive. These two manual controls of the clutch 26 are shown and described in an application filed by Clyde R. Paton, Serial No. 279,165 filed June 14, 1939.

The planetary gearing is controlled by a holding device that is responsive to an electrical system as shown and described in the application referred to. The sun gear has a ring member 55 splined on the forward portion thereof and housed in a recess in the front wall 11 of casing 10. The periphery of this ring is notched to receive a pawl 56 that is attached to a rod 57 forming the armature of a solenoid 58 and arranged to slide in a slot in wall 11. The arrangement is such that energizing the solenoid will move the pawl in one direction and a spring (not shown) will move the pawl in the opposite direction. When the pawl engages the notched ring splined to the sun gear it will be locked to the casing wall 11 and as the carrier 24 is splined to shaft 13, it will revolve around the sun gear causing the planet gear to drive the ring gear 22 at a modified speed from the drive shaft. In the present instance the modified drive is overdrive. When the pawl is released from the sun gear ring then the planetary gearing will not drive and is free to idle but for the constant engagement of the clutch 26 therewith. As this clutch is also constantly engaged with the driven shaft 16, the planetary ring gear must rotate with the driven shaft and free idling of the planetary gearing is eliminated. Thus the flywheel effect of the planetary gearing, when released by the pawl, tending to produce undesirable strains and vibration in the mechanism is avoided.

When the clutch 26 is in its rearmost position, as shown in Fig. 3, to which position it can be moved to by the two manually operable mechanisms, the teeth 28 while still engaging the teeth 30 will also engage the teeth 32 of the member 31 splined on the drive shaft. The drive will thus be positive direct from the drive shaft to the driven shaft and the drives through the planetary gearing and the overrunning clutch will be ineffective.

When the spring 40 is free to move the clutch 26 to its forward position, as shown in Fig. 1, the teeth 28 will engage only teeth 30 and of course the teeth 27 will engage teeth 25 on the driven shaft. With the clutch in this position, the drive will be from the drive shaft through the drive member 31, its hub 33 and rollers 34 to the driven shaft when the pawl 56 is released, thus providing direct overrunning drive. When the pawl is engaged to hold the sun gear, then the drive will be through the planetary gearing, member 24 splined to the planetary ring gear and clutch 26 to the driven shaft, thus providing overdrive.

It will thus be seen that clutch 26 always drivingly engages the driven shaft and the member splined to the planetary ring gear irrespective of the selected drive from the drive shaft to the driven shaft. As a result, the planetary gearing will always be positively rotated and will not be free to rotate uncontrolled.

In order to reduce vibration caused by backlash of the constantly meshing teeth 28 and 30, vibration damping means is provided. One or more of these devices can be utilized and they can take various forms. In the present instance the ring member 24 is formed with a plurality of recesses 60, for the reception of toothed plungers 61. These plungers are pressed into meshing relation with the teeth 28 on the clutch 26 by coil springs 62 arranged in recesses 60. At least one tooth of the clutch is straddled by the plunger teeth and the springs serve to wedge the teeth together sufficiently to substantially eliminate backlash chatter between the clutch and the ring member 24. Such vibration damping devices may offer a slight resistance to shifting of the clutch but not enough to be objectionable.

With the present invention undesirable vibration in drive modifying mechanism has been eliminated.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a transmission mechanism, a drive shaft, a driven shaft having a portion formed with clutch teeth, planetary gearing connected to be driven by said drive shaft, a member having clutch teeth drivingly connected with a portion of said planetary gearing, a shiftable clutch sleeve having teeth meshing with the clutch teeth of said driven shaft and said member, and means carried by said member and engaging said clutch sleeve teeth to resist relative rotative movement of said member and said shiftable clutch sleeve.

2. In a transmission mechanism, a drive shaft, a driven shaft, controlled planetary gearing drivingly connected to said drive shaft, a member drivingly connected to said drive shaft, clutch means connecting the driven portion of said planetary gearing in positive driving relation with said driven shaft, said clutch means having a shiftable portion adapted to be moved into and out of driven relation wtih said member without disengagement from said driven shaft or the driven portion of said planetary gearing, and means resisting relative rotation of said driven planetary gearing portion and said clutch means.

3. In a transmission mechanism, a drive shaft, a driven shaft, controlled planetary gearing in driven engagement with said drive shaft and including a driven ring gear, a toothed clutch ring fixed to said ring gear, toothed clutch means on said driven shaft, a toothed clutch sleeve in constant meshing relation with said toothed clutch ring and said toothed clutch means on said driven shaft, a plunger slidably mounted in said toothed clutch ring having a toothed end engaging teeth of said clutch sleeve, and a coil spring in said clutch ring exerting pressure radially against said plunger, said plunger wedging the engaged teeth of said clutch ring to resist rotative movement thereof relative to said clutch ring.

4. In a transmission mechanism, a drive shaft, a driven shaft, controlled planetary gearing including a drive member and a driven portion, said drive member being fixed to rotate with said drive shaft, a clutch member fixed on said drive shaft, a clutch ring in positive driving relation between said driven shaft and the driven portion of said planetary gearing, said clutch ring being shiftable to engage or release said clutch member while still in driving relation with the driven shaft and the driven portion of the planetary gearing, and means resisting relative rotative and axial movement of said clutch ring and the driven portion of said planetary gearing.

5. In a transmission mechanism, a drive shaft, a driven shaft, controlled planetary gearing drivingly connected to said drive shaft, a member drivingly connected to said drive shaft, clutch means connecting the driven portion of said planetary gearing in positive driving relation with said driven shaft, said clutch means having a shiftable portion adapted to be moved into and out of driven relation with said member without disengagement from said driven shaft or the driven portion of said planetary gearing, and friction means resisting relative rotation of said driven planetary gearing portion and said clutch means.

6. In a transmission mechanism, a drive shaft, a driven shaft having a portion formed with clutch teeth, planetary gearing connected to be driven by said drive shaft, a member having clutch teeth drivingly connected with a portion of said planetary gearing, a shiftable clutch sleeve having teeth meshing with the clutch teeth of said driven shaft and said member, and friction means resisting relative movement of said member and said shiftable clutch sleeve.

WALTER R. GRISWOLD.